United States Patent
Veya et al.

(10) Patent No.: US 6,787,583 B2
(45) Date of Patent: Sep. 7, 2004

(54) UV CURING INTAGLIO INK

(75) Inventors: Patrick Veya, Morges (CH); Olivier Amrein, Lausanne (CH); Alexia Christinat, Renens (CH)

(73) Assignee: SICPA Holding S.A., Prilly (CH)

( * ) Notice: Subject to any disclaimer, the term of this patent is extended or adjusted under 35 U.S.C. 154(b) by 75 days.

(21) Appl. No.: 10/312,562

(22) PCT Filed: May 15, 2002

(86) PCT No.: PCT/EP02/05331

§ 371 (c)(1),
(2), (4) Date: Jan. 10, 2003

(87) PCT Pub. No.: WO02/094952

PCT Pub. Date: Nov. 28, 2002

(65) Prior Publication Data

US 2004/0029989 A1 Feb. 12, 2004

(30) Foreign Application Priority Data

May 21, 2001 (EP) .............................. 01112378

(51) Int. Cl.⁷ ........................... C08F 2/46; C09D 11/00; B41E 9/08
(52) U.S. Cl. ........................... 522/149; 522/84; 522/86; 522/71; 522/74; 522/96; 522/100; 522/104; 522/90; 522/150; 522/152; 522/153; 522/154; 522/162; 522/165; 106/31.13; 427/508; 427/510; 427/511; 427/514; 428/411.1; 428/413; 428/423.1; 428/500; 101/150; 101/155; 101/170; 101/491
(58) Field of Search ............................. 522/84, 71, 74, 522/86, 90, 96, 104, 100, 149, 150, 152, 153, 154, 162, 165; 106/31.13; 427/508, 510, 511, 514; 428/411.1, 413, 423.1, 500; 101/150, 155, 170, 491

(56) References Cited

U.S. PATENT DOCUMENTS

| 4,358,476 A | | 11/1982 | Zimmer |
| 4,764,215 A | * | 8/1988 | Rudolph ..................... 428/497 |
| 5,201,943 A | * | 4/1993 | Monnerat ................ 106/31.13 |
| 5,630,869 A | * | 5/1997 | Amon et al. ............. 106/31.37 |
| 5,804,625 A | * | 9/1998 | Temperante et al. ........ 524/188 |
| 5,992,320 A | * | 11/1999 | Kosaka et al. ........... 101/401.1 |
| 6,540,345 B1 | * | 4/2003 | Wagner et al. ............. 347/103 |

FOREIGN PATENT DOCUMENTS

| DE | 2105179 | 8/1972 |
| EP | 0338791 | 10/1989 |
| EP | 0340163 | 12/1992 |
| EP | 813976 | 12/1997 |
| FR | 2274669 | 6/1975 |
| GB | 2256874 | 12/1992 |
| GB | 2311787 | 10/1997 |
| GB | 2357514 | 6/2001 |
| WO | WO88/00961 | 2/1988 |
| WO | WO91/16206 | 10/1991 |
| WO | WO99/10409 | 3/1999 |

* cited by examiner

Primary Examiner—James J. Seidleck
Assistant Examiner—Sanza L. McClendon
(74) Attorney, Agent, or Firm—Shoemaker and Mattare

(57) ABSTRACT

An intaglio printing ink comprising a first binder compound selected from the group of water-soluble or water-thinnable acrylate oligomers, and optionally, a second monomeric binder compound selected from the group comprising water-soluble or water-thinnable PEG diacrylate or polyethoxylated polyol triacrylate monomers to adjust the viscosity of the ink composition. To initiate polymerization of the binder compounds upon irradiation by electromagnetic radiation or electron beam radiation a photoinitiator is included. Further optional additives, such as pigments, fillers, photosensitizers, stabilizers emulsifiers and security pigments may be present. The ink shows excellent wipeability and allows precipitation from the wiping solution.

31 Claims, No Drawings

UV CURING INTAGLIO INK

The invention relates to an intaglio ink composition, a method of manufacturing and applying said composition, a use of said composition in an intaglio printing process and a method of precipitating the resulting wiping solution, as well as a security document realized by intaglio printing using said composition. The said ink composition comprises components which are polymerizable via a radical reaction path by irradiation with electromagnetic or electron beam radiation. The said ink composition additionally exhibits a suitable dispersibility in wiping solutions of low sodium hydroxide concentration.

The printing of security documents requires an outstanding printing quality and particular measures to prevent counterfeiting and forgery of the printed documents.

Security documents are printed preferably by the intaglio printing process. The term "intaglio printing" as used in this application shall apply to the so-called "engraved steel die" or "copper plate" printing process which is well known to the skilled in the art. The printing plates used herein are usually chromium plated, engraved nickel plates or cylinders, made by galvanic replication of an—often hand-engraved—original copper plate. The following shall not apply to the also well known rotogravure or gravure printing processes, which rely on a different type of ink.

In engraved steel die rotary printing, a rotating engraved steel cylinder carrying the pattern or image to be printed, is supplied with ink by one or more template inking cylinders by which a pattern of inks of different color is transferred to the printing cylinder. Subsequent to inking, any excess of ink on the plain surface of the printing cylinder is wiped off by a rotating wiping cylinder covered by a plastisol. Then, the remaining ink in the engraving of the printing cylinder is transferred under pressure onto the substrate to be printed, which may be paper or plastic material in sheet or web form. The wiping cylinder, in turn, is continuously cleaned using diluted aqueous sodium hydroxide as an emulsifying medium for the wiped-off excess ink, or a paper/calico wiping device, or an organic solvent such as trichloroethylene. These process steps and the machines used for engraved steel die printing are known to the skilled in the art.

Printing inks for the printing of security documents by the engraved steel die method on presently used sheet fed or web fed intaglio presses must satisfy to the following requirements:

correct rheological properties at the moment of ink transfer to the printing cylinder and at the moment of printing (rheology).

The ability of the ink to be easily and quantitatively removed from the non printing areas of the printing die surface (wipeability).

The ease of cleaning of the wiping cylinder with an aqueous solution containing 0.1 to 1% of caustic soda and a similar concentration of a detergent, or even with pure water (detergeability);

Stability of the ink before printing, on the inking rollers, until the moment of printing;

Film forming characteristics such that they allow further manipulation of sheets or webs carrying printed films of up to 200 microns thickness at latest 24 hours after printing or, preferably, immediately after printing;

Non-offsetting properties: In the case of printing on continuous web at speeds going up to 150 m/minute, the immediate rewinding of the printed substrate is mandatory. The ink system must assure that there is no ink transfer from the freshly printed surface to the backside of the enrolled substrate which is in contact with it. In the case of web printing machines equipped with hot air drying devices (as supplied e.g. from TEC-Systems, W.R. Grace & Co.), web printing speeds of up to 150 m/min. have to be withstood, using engraving depths of up to 200 microns. On sheet fed presses, 500 to 10,000 sheets, depending on the particular printing substrate and on the depth of the engravings, must be stacked on piles right after printing, without interleaving sheets;

outstanding chemical and mechanical resistance of the printing according to specifications established by INTERPOL at the $5^{th}$ International Conference on Currency and Counterfeiting in 1969, or to the Bureau of Engraving and Printing's test methods as stated in BEP-88-214 (TN) section M5;

acceptable toxicologic and environmental properties.

As it is known in the art of printing, the printed substrate must generally be dried in order to allow subsequent processing, and to achieve the required resistance properties of the final product.

By the term "drying", three different mechanisms are addressed, as it is well known to the man skilled in the art of printing. Two mere physical drying processes refer to the evaporation of volatile solvent from the printed ink paste, leaving back its solid resin and pigment components, and to the resorption (sucking) of nonvolatile ink solvent into the substrate. A third, chemical drying process, also called hardening or curing, refers to the transformation of a liquid composition into the solid state by a chemical polymerization or cross-linking reaction. One or more of these drying processes may be implied in the drying of a same particular printing ink, and the printer does generally not make a difference between physical and chemical drying.

Intaglio inks are usually cured by an oxidation reaction. This is a rather slow drying method, and documents correspondingly printed and stacked as sheets cannot usually be handled for further processing before a drying time period of one to several days.

The curing of printed inks by UV radiation is known and widely introduced in the art of printing. UV curing allows a rapid, almost instantaneous drying of the printed ink film, and hence opens the way to increase production speed. The chemical curing reaction is in most cases initiated by radicals, created by the UV irradiation. To obtain sufficient sensitivity to the UV radiation, it is necessary to incorporate a photoinitiator into the printing ink, said photoinitiator being decomposed under the influence of the UV radiation, forming free radicals, which in turn initiate the curing reaction.

FR 2274669 describes an intaglio printing ink based on a varnish (binder) based on tung oil and unsaturated aliphatic dicarboxylic acids, which can be cured by UV irradiation in the presence of oxygen. Due to the type of chemical compounds used, the curing (polymerization) speed of this kind of binder is rather low, thus requiring a long period of time to complete reaction. This intaglio ink is further described to be dispersible in caustic alkali solutions wherein the concentration of the caustic alkali compound usually ranges from 0.5 to 2% by weight. In order to promote the dispersion in the wiping solution, surface tension active molecules (surfactants) like sulfonated castor oil or sodium laurylsulfate must be added.

EP 432093 describes another intaglio ink which is dispersible in caustic alkali solution. The concentration range of the caustic alkali solution is the same as in the aforementioned patent. The said intaglio ink cures upon UV irradiation via a cationic polymerization process. The proposed photoinitiators are representing toxicological hazards, however, as they contain toxic chemical elements such as As, Sb, or F, respectively.

It is an object of the present invention to overcome the shortcomings of the prior art; in particular by disclosing an intaglio ink composition which can be easily and completely cured, which requires less environmentally demanding compounds for the necessary post-wiping treatment on the printing press, and which does not contain toxicologically problematic additives. A further property of the disclosed intaglio ink is the water solubility of the ink and a simple, fast and economic way to precipitate the dissolved ink from the wiping solution.

Another object of the present invention is to provide printing inks which are curable by UV- or by shortwave visible light radiation, for the printing of security documents by the engraved steel die printing method. Still another object of the invention is to provide a printing ink which has improved water solubility, compared to the known printing inks. A further object of the invention is to provide a UV-curing printing ink based on photoinitiator compounds of low toxicity.

These and other objects are achieved by the invention in accordance with the independent claims.

The printing ink of the present invention for the intaglio printing process comprises a binder which is selected from the group of water-soluble or water-thinnable acrylate oligomers. In accordance with the invention urethane acrylate oligomers and epoxy acrylate oligomers are the preferred oligomers, because these products are either commercially available or are easily prepared, starting from commercial products. Water-soluble urethane acrylates can be prepared from water-soluble or hydrophilic polyols (ethoxylated polyols such as ethoxylated trimethylolpropane supplied from Perstorp Speciality Chemicals, Sweden) and 2-hydroxyethyl acrylate or ethoxylated monoacrylates (such as polyethylene or polypropylene glycol monoacrylates, Bisomer, supplied by Laporte Performance Chemicals, UK) which are grafted to the water-soluble polyols using diisocyanates (toluene diisocyanate TDI, hexane-1,6 diisocyanate HDDI, isophorone diisocyanate IPDI, etc.).

Water-soluble epoxy acrylates can be prepared from ethoxylated di- or triglycidyl ethers (such as polyethylene or polypropylene glycol diglycidyl ethers, for example diethylene glycol diglycidyl ether supplied by Sigma-Aldrich, polyoxypropylene di- and triglycidylethers, Eurepox supplied by Witco and for example the triglycidyl ether based on 9-ethoxylated trimethylol propane, Grilonit V51-56, supplied by EMS Chemie, Switzerland) by the addition of acrylic acid using a standard procedure.

Alternative oligomers which can be used are polyester acrylates and acrylic acrylates. Each oligomer comprises reactive acrylate functionalities and two or more repeating units separating the functional groups. The term "oligomer" is used to designate molecules which are obtained by chemically linking together two or more reactive units (monomers), whereby the number of linked reactive units remains still relatively small. Oligomers are the intermediate stage between the monomers and the final polymer. They have a molecular weight which is higher than the molecular weight of the monomers but lower than the $M_W$ of the resulting final polymer. Acrylate monomers are molecules which contain a reactive acrylate ($R_1R_2C{=}CR_3{-}CO{-}OR_0$) group ($R_0$ being either an organic residue, a hydrogen atom, or a negative charge). Acrylate oligomers are higher molecular weight products resulting of the cross-linking, via the acrylic double bond, of two or more acrylate monomers.

Monomers, having low viscosity, are also described as reactive diluents, due to the fact that they are capable of reducing the viscosity of an oligomer or pre-polymer whilst being incorporated into the structure of the cured final film. Binders or resins, which are essentially medium- to low-molecular weight polymers of synthetic or natural origin, are used in inks and coating compositions to "glue" desired functional additives, such as pigments, to a substrate, and/or to produce a higher-molecular weight, cross-linked coating on the surface of the substrate, which gives it desired properties and appearance.

Radiation curable oligomers or pre-polymers have much lower molecular weight than resins. They consist of at most a few, repeated monomeric units, which, upon interaction with incident radiation of sufficient energy, combine ("polymerize") to give a cross-linked high molecular weight structure. The terms "oligomer" and "pre-polymer" are generally used interchangeably in the technology field of radiation curable coatings or inks, and are understood as being distinct from the term "monomers".

Strictly speaking, a monomer is a molecular species which is able to form chemical links with the same or with similar types of molecules, resulting in chains, sheets or three-dimensional networks (polymers) which may comprise between a few up to a very large number of monomeric building blocks. In the context of the present invention, monomers are understood as molecular units which are polymerizable through the effects of radiation, and which are generally, but not necessarily, of lower molecular weight than oligomers and prepolymers. Monomers have generally a lower viscosity than oligomers and can be used as reactive diluents to : decrease the viscosity of radiation curable formulations, improve the curing speed and increase the cross-link density (Chemistry & Technology of UV & EB formulation for coatings, inks and paints, vol. 2, p. 31).

In the context of the present disclosure the term "water solubility" means that an amount of 5 g of the compound referred to is soluble in 95 ml of the wiping solution at a temperature comprised between 20° C. and 50° C. The corresponding cloud point temperature should be either below 20° C. or above 50° C. The usual wiping solutions for intaglio printing comprise caustic soda in a concentration range of between 0.5 to 1.2%. For the intaglio inks of the present invention, the caustic soda concentration is comprised in between 0% (pure water) and 0.5%. The concentration of intaglio ink in the wiping solution does not exceed 5% in general. Water-soluble or water-thinnable acrylates of the present invention are selected as outlined above.

The group of urethane acrylates noteworthy comprises aliphatic urethane acrylates, aliphatic urethane diacrylates and urethane acrylate oligomers which are available from different suppliers. The group of epoxy acrylates comprizes aliphatic epoxy acrylates, aliphatic epoxy diacrylates and epoxy acrylate oligomers, which are experimental products available from Sicpa S.A. France, as described here above. The binder can also be a mixture of the aforementioned groups of acrylate oligomers. The use of water-soluble or water-thinnable compounds reduces the amount of emulsifiers or surface tension active compounds needed to achieve a suitable dispersibility of the printing ink in aqueous solutions.

Another, optional but preferred component of the printing ink composition are monomers selected from the group of water-soluble or water-thinnable polyethyleneglycol (PEG) diacrylate or polyethoxylated polyol triacrylate monomers, and which are used to adjust the viscosity of the printing ink to the required value. The PEG diacrylate monomers comprise compounds like PEG-X diacrylate monomers with X ranging from 200 to 700, which are available from different suppliers. The (poly)ethoxylated polyol triacrylate monomers comprise compounds like 7-ethoxylated trimethylolpropane triacrylate (TMPTA), 14-ethoxylated TMPTA, 15-ethoxylated TMPTA, 20-ethoxylated TMPTA or 15-ethoxylated bisphenol-A diacrylate monomers. Most of the compounds listed above are commercially available. This list is not to be understood as being complete and limiting the number of useful compounds in the mentioned classes.

The viscosity of the ink composition depends among others of its detailed contents in water, pigments, fillers and other formula components. However, there are limits as to the quantities of each of these substances in view of the printing process and the desired properties of the imprint. For example, in intaglio printing, an excess quantity of water in the ink is detrimental due to high pressure during printing.

A further component of the printing ink is the photoinitiator which is needed to initiate the polymerization reaction of the described binder after irradiation by electromagnetic radiation or electron beam radiation.

Further components of the printing ink composition are additives such as pigments for providing the color of the ink, fillers, photosensitizers, photostabilizers, emulsifiers, as well as special additives for security purposes.

According to the invention the binder and optionally the additional monomers have to be selected appropriately in order to produce a composition which is substantially dispersible to 100% in a water wiping solution. A value of 100% being the optimum value. The term "dispersible" is to be understood as defined in Römpp Lexikon, "Lacke und Druckfarben", published 1998, Thieme Verlag Stuttgart, page 147. The water wiping solution may contain sodium hydroxide in a concentration range between 0 and 0.5% by weight. The concentration of sodium hydroxide is, however, preferably chosen between 0.1 and 0.3% and even more preferably between 0.1 and 0.2% by weight. A substantially full dispersibility of the ink composition will avoid the separation of the ink composition from the water wiping solution and thus avoid possibly a clogging of parts of the system containing the water wiping solution. Further, as it will be discussed below it allows to enhance the recovering of unused ink from the water wiping solution.

The low sodium hydroxide concentration of the wiping solution required to print the ink of the present invention has the advantage of causing much less environmental charge, as compared to the wiping solutions of much higher sodium hydroxide concentration required to print the inks described in the prior art. The low-concentrated sodium hydroxide solutions used to print the ink of the present invention do, however, still provide sufficiently alkaline conditions to efficiently corrosion-protect the wiping system.

A major aspect of the invention concerns the adjustment and control of the viscosity of the intaglio printing ink. The viscosity of the printing ink composition is chosen to be in between 7 and 60 Pa.s at 40° C. A viscosity in between 12 and 40 Pa.s is preferable, and a viscosity of the composition between 15 and 30 Pa.s at 40° C. is even more preferable in order to achieve suitable rheological properties of the ink in the printing process.

As part of the invention the viscosity of the binder is selected to lie in the range between 5 and 40 Pa.s at 40° C. This opens the possibility to reduce the amount of further formula components for achieving the necessary rheological properties of the ink.

The binder is preferably selected from the aforementioned group of compounds having a molecular weight $M_W$ between 1,500 and 10,000 g/mole, whereby the molecular weight $M_W$ is determined according to the procedures described in Polymer Synthesis, $2^{nd}$ revised edition by Paul Rempp and Edward W. Merrill, Ed. Hüthig & Wepf 1991, 344 pages. This range of molecular weights provides the ink with sufficient ability for crosslinking thoroughly and building a stable three dimensional network.

In the composition of the intaglio printing ink, the content of water-soluble or water-thinnable urethane acrylate or epoxy acrylate oligomers is comprised between 30 to 70% of the ink's total weight. A preferable content of binder is in the range between 40 and 60%, and more preferably between 45 and 55%, each referred to the total weight of the composition.

According to the invention, the content of water-soluble or water-thinnable PEG diacrylate or polyethoxylated polyol triacrylate monomers is preferably selected between 5 and 25% by weight, referred to the total weight of the ink. A preferred content of water-soluble or water-thinnable PEG diacrylate or polyethoxylated polyol triacrylate monomers is between 10 and 20% by weight, and a content between 10 and 15% by weight is even more preferred.

The amount of water-soluble or water-thinnable PEG diacrylate or polyethoxylated polyol triacrylate or tetraacrylate monomers allows an adjustment of the viscosity of the total printing ink composition. At the same time these components provide similar functional groups as those of the ink binder and participate thus in an optimal manner in the formation of the polymerized binder matrix.

The intaglio printing ink comprises a photoinitiator which is capable of initiating a radical polymerization reaction within the aforementioned binder and monomers. The appropriate type of photoinitiator allows to start the appropriate type of polymerization reaction, which ideally proceeds with a high reaction rate and provides a rapid curing of the printed ink.

According to another aspect of the invention the photoinitiator can be selected from the group consisting of acetophenone or benzophenone types of compounds. These types of photoinitiators are well known to break up into free radicals following irradiation with UV or short-wavelength visible light, said radicals being capable of initiating the polymerization processes.

Additionally the photoinitiator may have a maximum absorption at wavelengths between 300 nm and 450 nm. Radiation of these wavelengths is easily produced by devices such as a Hg medium pressure lamp, or a Ga/Pb, Fe/Co doped Hg lamp, respectively.

Another aspect of the invention is in the use of a photosensitizer, allowing for a higher yield of captured UV or shortwave visible photons. The photosensitizer is selected from the thioxanthone group of chemical compounds. This group includes for example isopropyl-thioxanthone (ITX), 1-chloro-2-propoxy-thioxanthone (CPTX), 2-chloro-thioxanthone (CTX) and 2,4-diethyl-thioxanthone (DETX), as well as mixtures thereof.

According to a further aspect of the invention, an UV-stabilizer is added to the ink. In the inks of the present invention, Florstab UV-1, supplied by Kromachem Ltd, UK, has been successfully used. The presence of the UV-stabilizer serves to avoid a premature polymerization during the preparation or during the handling of the ink prior to uses as well as on the printing press prior to the radiation-curing step.

Still another aspect of the invention concerns the pigment content of the printing ink composition. According to the invention, a weight percentage of the pigment between 3 to 23% can be used. Preferred is a pigment content of between 5 to 12%, and even more preferably a pigment content of between 7 to 10%, related to the total weight of the ink. The type of pigment is selected from the group of pigments which can be applied in UV-curing inks according to the art.

According to a further aspect of the invention the filler content of the composition is chosen to amount to between 6 and 50% by weight of the ink. The amount of filler lies preferably between 25 and 40% and more preferably between 25 and 35%, referred to the total weight of the ink.

Still according to another aspect of the invention, the filler is selected from the group of natural and artificially prepared calcium carbonates. The type of calcium carbonate is preferably selected from grades which have a low oil absorption in order to avoid a trapping of part of the binder within the filler, which results in an incomplete polymerization of the binder.

A further part of the invention is a method for manufacturing an intaglio printing ink composition having a viscosity of between 7 and 60 Pa.s at 40° C. A more preferred viscosity range is between 12 and 40 Pa.s, and an even more preferred range is between 15 and 30 Pa.s at 40° C. The ink viscosity is adjusted according to the invention by adding water-soluble or water-thinnable PEG diacrylate or polyethoxylated polyol triacrylate monomers.

A further part of the invention is a method of applying a radiation curing intaglio printing ink in an intaglio printing process using a water wiping system. The water wiping system uses a wiping solution having a sodium hydroxide concentration between 0 and 0.5% by weight, preferably between 0.1 and 0.3% and more preferably between 0.1 and 0.2% by weight.

The ink waste dissolved in the wiping solution after the printing process can be precipitated by adding an inorganic metal halide or sulfate salt solution. This process is also called flocculation. The effect responsible for this change of solubility of the printing ink is the so-called "salting out" which is well known in the field of water-soluble organic polymers. The addition of such inorganic salt solution allows to recover a large amount of the printing ink dispersed in the waste wiping solution, and allows therefore to release a less polluted waste water. The precipitated ink can be recovered by standard solid-liquid separation methods, such as filtration, ultra-filtration, centrifugation, etc., as known to the skilled in the art.

The remaining soluble organic contents of wiping solution after the ultrafiltration, floculation and filtration treatment can be determined with the help of Chemical Oxygen Demand (COD), Total Organic Carbon (TOC) and Dissolved Organic Carbon (DOC) measurements which are standard procedures in the field of waste-water characterization. Environment-friendly intaglio inks are characterized by low COD, TCO or DOC values of the residual wiping-solution waste.

The invention also includes a method for the precipitation of the aforementioned intaglio ink from a wiping solution of an intaglio printing press. Said precipitation is noteworthy brought about by the addition of an inorganic metal halide or sulfate salt solution such as solutions of calcium chloride, iron chloride, sodium chloride, potassium chloride or aluminum sulfate.

The invention comprises further a method for precipitating dispersed intaglio printing ink waste from a wiping solution, said method including the adjustment of the temperature of the water wiping solution to fall within a range of between 20 and 50° C., preferably of in between 20 and 40° C., and more preferably of in between 25° and 35° C. The temperature noteworthy affects the solubility of the printing ink in the wiping solution.

In a further aspect the invention provides a method of making an intaglio printing on a substrate using the ink composition of the invention. Said printing using said ink allows noteworthy a film thickness of 20 to 60 microns, preferably of 30 to 50 microns, to be deposited on paper or polymer substrates. A noteworthy advantage of the inks of the invention is that said rather high film thickness can be cured thoroughly and rapidly by irradiation with electromagnetic radiation or with electron beam radiation, providing an excellent and thoroughly dried imprint, having excellent chemical and physical resistance, as well as tack-free printing surfaces immediately upon leaving the printing press.

The invention will now be explained further by non-limiting composition examples which are given for illustration purposes.

List of Abbreviations:

| | | |
|---|---|---|
| Ebecryl 2001 | UCB | aliphatic urethane diacrylate oligomer |
| Ebecryl 2002 | UCB | aliphatic urethane acrylate oligomer |
| L300-627 | SICPA France | Urethane acrylate oligomer |
| IRR 210 | UCB | alkoxylated triacrylate |
| IRR 280 | UCB | PEG-400 diacrylate |
| Photomer 4155 | Cognis 7-ethoxylated TMPTA | |
| Photomer 4158 | Cognis 14-ethoxylated TMPTA | |
| OVP ® | Optically Variable Pigment from Flex Corp., Santa Rosa. | |
| OVI ® | Optically Variable Ink supplied by Sicpa S.A., Lausanne | |

EXAMPLE I

The inks have been prepared according to the general formula, printed and cured

| Samples | A | B |
|---|---|---|
| Ebecryl 2002 | 46.6 | |
| L300-627 | | 46.6 |
| Wax (Montan) | 4.0 | 4.0 |
| Emulsifier | 3.0 | 3.0 |
| UV stabilizer | 2.0 | 2.0 |
| IRGALITE RED 8B | 8.0 | 8.0 |
| Filler (CaCO$_3$) | 30.0 | 30.0 |
| ESACURE ITX | 2.6 | 2.6 |
| IRGACURE 369 | 3.8 | 3.8 |
| Total | 100.0 | 100.0 |

| Results | A | B |
|---|---|---|
| Viscosity/[Pa · s] | 27 | 45 |
| Tack/[T.U.] | 240 | 300 |
| Wiping/paper* | 5 | 5–6 |
| Printing quality/[60° C.]* | 5–6 | 5–6 |
| Drying/[2 × 50 m/min]* | 3–4 | 3 |
| Deterg. at 0.1% NaOH* | 5–6 | 4–5 |
| COD [mg O$_2$.L$^{-1}$] | 6'500 | 10'800 |

*6 = very good; 5 = good; 4 = satisfying; 3 = poor; 2 = very poor;

The classification of the results of the wiping, printing quality, drying and detergibility in 0.1% NaOH solution is established according to laboratory experience.

EXAMPLE II

The inks have been prepared according to the procedure as described for example I.

| Samples | C | D |
|---|---|---|
| Ebecryl 2002 | 35.6 | 35.6 |
| IRR 210 |  | 11.0 |
| IRR 280 | 11.0 |  |
| Wax (Montan) | 4.0 | 4.0 |
| Emulsifier | 3.0 | 3.0 |
| UV stabilizer | 2.0 | 2.0 |
| IRGALITE RED 8B | 8.0 | 8.0 |
| Filler (CaCO$_3$) | 30.0 | 30.0 |
| ESACURE ITX | 2.6 | 2.6 |
| IRGACURE 369 | 3.8 | 3.8 |
| Total | 100.0 | 100.0 |

| Results | C | D |
|---|---|---|
| Viscosity/[Pa · s] | 16 | 20 |
| Tack/[T.U.] | 110 | 130 |
| Wiping/paper* | 5–6 | 5–6 |
| Printing quality/[60° C.]* | 5–6 | 5–6 |
| Drying/[2 × 50 m/min]* | 5 | 5 |
| Deterg. at 0.1% NaOH* | 5 | 5 |
| COD [mg O$_2$.L$^{-1}$] | 10'675 | 10'865 |

*6 = very good; 5 = good; 4 = satisfying; 3 = poor; 2 = very poor;

EXAMPLE III

| Samples | E | F |
|---|---|---|
| Ebecryl 2001 | 32.0 |  |
| Ebecryl 2002 |  | 35.6 |
| Photomer 4155 | 14.6 |  |
| Photomer 4158 |  | 11.0 |
| Wax (Montan) | 4.0 | 4.0 |
| Emulsifier | 3.0 | 3.0 |
| UV stabilizer | 2.0 | 2.0 |
| IRGALITE RED 8B | 8.0 | 8.0 |
| Filler (CaCO$_3$) | 30.0 | 30.0 |
| ESACURE ITX | 2.6 | 2.6 |
| IRGACURE 369 | 3.8 | 3.8 |
| Total | 100.0 | 100.0 |

| Results | E | F |
|---|---|---|
| Viscosity/[Pa · s] | 27 | 14 |
| Tack/[T.U.]* | 225 | 125 |
| Wiping/paper* | 5–6 | 5–6 |
| Printing quality/[60° C.]* | 5–6 | 5–6 |
| Drying/[2 × 50 m/min]* | 5 | 5–6 |
| Deterg. at 0.1% NaOH* | 5 | 5 |
| COD [mg O$_2$.L$^{-1}$] | 10'590 | 10'700 |

*6 = very good.; 5 = good.; 4 = satisfying; 3 = poor; 2 = very poor;

EXAMPLE IV

The following samples are disclosed with the use of a PEG400DA (IRR280 or Cray Valley SR344) monomer and an aliphatic urethane acrylate oligomer (Ebecryl 2002). Different examples have been prepared and tested including a red, a magnetic green and OVI® formulations

| Sample G: | Red |
|---|---|
| L300-600 | 35.6 |
| IRR280 | 11.0 |
| Wax (Montan) | 4.0 |
| Emulsifier | 3.0 |
| UV stabilizer | 2.0 |
| IRGALITE RED 8B | 8.0 |
| Filler (CaCO$_3$) | 30.0 |
| ESACURE ITX | 2.6 |
| IRGACURE 369 | 3.8 |
| Total | 100.0 |

| Sample H: | Magnetic green |
|---|---|
| Ebecryl 2002 | 46.6 |
| Wax (Montan) | 4.0 |
| Emulsifier | 3.0 |
| UV stabilizer | 2.0 |
| Mapico yellow 215 | 9.5 |
| IRGALITE GREEN GL | 1.5 |
| Carbon Black Raven | 0.45 |
| IRGALITE BLUE LGLD | 0.35 |
| Filler (CaCO$_3$) | 26.1 |
| ESACURE ITX | 2.6 |
| IRGACURE 369 | 3.8 |
| Total | 100.0 |

| Sample I: | OVI ® green to blue |
|---|---|
| Ebecryl 2002 | 46.6 |
| Wax (Montan) | 4.5 |
| Emulsifier | 3.0 |
| UV stabilizer | 2.0 |
| OVP Green/Blue | 22.0 |
| Filler (CaCO$_3$) | 6.5 |
| Aerosil 200 | 9.0 |
| ESACURE ITX | 2.6 |
| IRGACURE 369 | 3.8 |
| Total | 100.0 |

| Results | Sample G | Sample H | Sample I |
|---|---|---|---|
| Viscosity/[Pa.s] | 6–7 | 30–40 | 30–40 |
| Tack/[T.U.]* | 100 | 200 | 240 |
| Wiping/paper* | 5–6 | 5–6 | 5–6 |
| Printing quality/[60° C.]* | 5* | 5–6 | 5 |
| Drying/[2 × 50 m/min]* | 4–5* | 4–5 | 5–6 |
| Deterg. At 0.1% NaOH* | 5* | 5–6 | 5–6 |

*6 = very good; 5 = good; 4 = satisfying; 3 = poor; 2 = very poor.

EXAMPLE V

| Sample J |  |
|---|---|
| Ebecryl 2002 | 35.6 |
| IRR280 | 11.0 |
| Wax (Montan) | 4.0 |
| Emulsifier | 3.0 |
| UV stabilizer | 2.0 |
| IRGALITE RED 8B | 8.0 |
| Filler (CaCO$_3$) | 30.0 |

-continued

| Sample J | |
|---|---|
| ESACURE ITX | 2.6 |
| IRGACURE 369 | 3.8 |
| Total | 100.0 |

The ink of the above listed composition has been printed in industrial printing conditions. The first printing trial was run with the MiniOrlof Intaglio MOI printing press from De La Rue-Giori using both, a pure water wiping solution and a 0.1% NaOH wiping solution. In both conditions, printing quality and wiping were excellent. A second printing trial was run with the SuperOrlof Intaglio SOI printing press in the same conditions. In the case of a pure water wiping solution, the ink of example 1 was wiped off the plate and deterged from the wiping cylinder in a correct way. The wiping and deterging of the ink was substantially improved when using a 0.1 or 0.2% NaOH wiping solution. At further increased NaOH concentration (0.3% NaOH and more), wiping and deterging problems appeared again, which gradually worsened with further increasing NaOH concentration.

COD values have been measured for Sample J in both situations:

| Sample J/CaCl$_2$ (35%) | COD [mg O$_2$.L$^{-1}$] |
|---|---|
| Pure water solution pH = 6–7 | 2'750 |
| 0.2% NaOH, pH = 10–11 | 3'340 |

EXAMPLE VI

Sample K is like sample J but IRR280 is replaced by Ebecryl 2002.

COD of sample G has been measured. 3 g of fresh ink is dispersed for 1–2 hours in 97 g of water (NaOH 0.1%) and heated at 50° C. The ink dispersion is allowed to cool under stirring. At 30° C., 1.5% of fossil meal is added. A 10% CaCl$_2$ solution is added slowly in small portions (total 1.5 mL). Three different salt have been used to precipitate the ink disclosed in sample G. The fluffy red precipitate is filtered off using a paper filter. The solution is analysed in the same conditions.

| COD [mg O$_2$.L$^{-1}$] | Sample G | Sample J | Sample K |
|---|---|---|---|
| NaCl 10% | 10700 | 7530 | 5650 |
| CaCl$_2$ 10% | 10600 | 7490 | 6490 |
| FeCl$_3$ 10% | 10670 | 7530 | 7600 |
| Al$_2$(SO$_4$)$_3$ 10% | 10570 | 7440 | 6940 |

As it can be seen from these results, COD values do not seem to be related to the nature or the charge of the polyvalent cations used for flocculating the ink waste. The nature of the acrylate oligomers or monomers is more critical, however.

What is claimed is:

1. An intaglio pruning ink composition comprising
    (a) a first binder compound selected from the group of water-soluble or water-thinnable acrylate oligomers;
    (c) a photoinitiator to initiate polymerization of the binder upon irradiation by electromagnetic radiation or electron beam radiation;
    wherein the first binder is selected to make the composition substantially fully dispersible in a water wiping solution having a sodium hydroxide concentration not greater than 0.5%.

2. An intaglio printing ink according to claim 1, wherein the first binder component is a water-soluble or water-thinnable urethane acrylate oligomer.

3. An intaglio printing ink according to claim 1, wherein the first binder component is a water-soluble or water-thinnable epoxy acrylate oligomer.

4. An intaglio printing ink according to claim 1, wherein the first binder component is a water-soluble or water-thinnable acrylic acrylate oligomer.

5. An intaglio printing ink according to claim 1, wherein the first binder component is a water soluble or water-thinnable polyester acrylate oligomer.

6. An intaglio printing ink according to claim 1, wherein the first binder component is a mixture of water-soluble or water-thinnable oligomers selected from the group consisting of urethane acrylate oligomer, epoxy acrylate oligomer, acrylic acrylate oligomer and polyester acrylate oligomer.

7. An intaglio printing ink according to claim 1, wherein the viscosity of the ink composition is 7–60 Pa at 40° C.

8. An intaglio printing ink according to claim 7, further comprising a second monomeric binder compound selected from the group comprising water-soluble or water-thinnable PEG diacrylate or polyethoxylated polyol triacrylate monomers to adjust viscosity.

9. An intaglio printing ink according to claim 7, further comprising additives, preferably pigments, filler, photosensitizers, photostabilizers, emulsifiers, security pigments.

10. An intaglio printing ink according to claim 1, wherein the viscosity of the first binder is 5–40 Pa at 40° C.

11. An intaglio printing ink according to claim 1, wherein the molecular weight of the first binder is between 1,500 and 10,000 g/mole.

12. An intaglio printing ink according to claim 1, wherein the content of water-soluble or water-thinnable acrylate oligomers is between 30% and 70% related to the total weight of the ink.

13. An intaglio printing ink according to claim 1, wherein the content of water-soluble or water-thinnable PEG diacrylate or polyethoxylated-polyols triacrylate monomers is between 5% and 25% related to the total weight of the ink.

14. An intaglio printing ink according to claim 1, wherein the photoinitiator is capable of initiating radical polymerization reactions of the first binder and the second binder.

15. An intaglio printing ink according to claim 14, wherein the said photoinitiator is selected from the group consisting of acetophenone and benzophenone type compounds.

16. An intaglio printing ink according to claim 15, wherein the said photoinitiator has a maximum absorption between 300 and 450 nm wavelength.

17. An intaglio printing ink according to claim 1, wherein the photosensitizer is selected from the thioxanthone group of compounds.

18. An intaglio printing ink according to claim 17, wherein said photosensitizer is selected from the group consisting of isopropyl-thioxanthone (ITX), 1-chloro-2-propoxy-thioxanthone (CPTX), 2-chloro-thioxanthone (CTX) and 2,4-diethyl-thioxanthone (DETX).

19. An intaglio printing ink according to claim 1, further comprising a UV-stabilizer to prevent premature polymerization of the ink.

20. An intaglio printing ink according to claim 1, wherein the pigment contents of the composition is 3%–15% related to the total weight of the ink.

21. An intaglio printing ink according to claim 1, wherein the filler content of the composition is between 20% and 50% related to the total weight of the ink.

22. An intaglio printing ink according to claim 21, wherein the filler is selected from the group comprising calcium carbonate grades having low oil absorption.

23. An intaglio printing ink according to claim 1, wherein said water wiping solution has a sodium hydroxide concentration between 0.1% and 0.3%.

24. A method for manufacturing an intaglio printing ink composition according to claim 1, comprising steps of adding water-soluble or water-thinnable PEG diacrylate or polyethoxylated polyol triacrylate monomers, and adjusting the viscosity of the composition to 7–60 Pa at 40° C.

25. A method of using a composition according to claim 1 in an intaglio printing process, the method comprising a step of providing said composition to the printing process, wherein said process comprises a wiping system including a water wiping solution having a sodium hydroxide concentration not greater than 0.5%.

26. A method of applying a radiation curing intaglio printing ink composition according to claim 1, comprising the steps of:

providing said ink composition to an intaglio printing process comprising a wiping system, and separating a waste ink from a wiping solution by adding an inorganic metal halide or sulfate salt solution, wherein said wiping solution has a sodium hydroxide concentration not greater than 0.5%.

27. A method of precipitating an intaglio ink according to claim 1, comprising the step of adding sit inorganic metal halide or sulfate salt solution to a wiping solution, wherein said ink being dispersed in a wiping solution of an intaglio printing press.

28. A method according to claim 27 comprising the step of adjusting the temperature of said wiping solution to 20° C.–50° C.

29. A method of making an intaglio imprint on a substrate using an intaglio printing ink according to claim 1, comprising the steps of printing said ink in a film thickness of 20–60 microns onto said substrate, and curing said imprint by irradiation with electromagnetic, radiation or electron.

30. A security document comprising an imprint made by a method for making an intaglio imprint according to claim 29.

31. A security document comprising an imprint made by an intaglio printing ink composition according to claim 1.

* * * * *